United States Patent
Zhang

(10) Patent No.: US 11,904,642 B2
(45) Date of Patent: Feb. 20, 2024

(54) TPMS INFLATION VALVE FOR COMMERCIAL VEHICLE AND TPMS SENSOR SUBASSEMBLY

(71) Applicant: HAMATON AUTOMOTIVE TECHNOLOGY CO., LTD., Hangzhou (CN)

(72) Inventor: Jianer Zhang, Hangzhou (CN)

(73) Assignee: HAMATON AUTOMOTIVE TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/627,339

(22) PCT Filed: Oct. 21, 2019

(86) PCT No.: PCT/CN2019/112224
§ 371 (c)(1),
(2) Date: Jan. 14, 2022

(87) PCT Pub. No.: WO2021/007974
PCT Pub. Date: Jan. 21, 2021

(65) Prior Publication Data
US 2022/0314715 A1    Oct. 6, 2022

(30) Foreign Application Priority Data

Jul. 16, 2019   (CN) .......................... 201910638135.3

(51) Int. Cl.
*B60C 23/04*   (2006.01)

(52) U.S. Cl.
CPC ............................... *B60C 23/0496* (2013.01)

(58) Field of Classification Search
CPC . B60C 23/04; B60C 23/0496; B60C 23/0498; Y10T 137/3662; Y10T 137/3584
(Continued)

(56) References Cited

U.S. PATENT DOCUMENTS 6,799,455 B1 * 10/2004 Neefeldt ............. B60C 23/0408
73/146
2006/0173648 A1 * 8/2006 Chang ................. B60C 23/0498
702/138
(Continued)

FOREIGN PATENT DOCUMENTS

CN         202242819 U    5/2012
CN         204415058 U    6/2015
(Continued)

*Primary Examiner* — Robert K Arundale

(74) *Attorney, Agent, or Firm* — Muncy, Geissler, Olds & Lowe, P.C.

(57) ABSTRACT

A TPMS inflation valve for a commercial vehicle includes an inflation valve body, an inflation valve seat and a sensor subassembly. The inflation valve body and the inflation valve seat are components split apart from each other. The inflation valve is mounted on an automobile rim by means of the inflation valve seat, and the inflation valve body is provided with an installation portion for a valve core. The inflation valve body and the inflation valve seat are assembled and connected to form an airflow channel for communication. A cavity located outside the automobile rim and close to the automobile rim is formed at the position where the inflation valve body and the inflation valve seat are assembled and connected. The sensor subassembly is arranged in the cavity in communication with the airflow channel of the inflation valve or located on the airflow channel.

8 Claims, 2 Drawing Sheets

(58) Field of Classification Search
USPC .......................................................... 73/146.8
See application file for complete search history.

(56) References Cited

U.S. PATENT DOCUMENTS

| | | | | |
|---|---|---|---|---|
| 2010/0083767 | A1* | 4/2010 | Kurtz | ................... B60C 23/0408 |
| | | | | 73/727 |
| 2013/0299007 | A1* | 11/2013 | Faretra | ................. B60C 23/0496 |
| | | | | 137/227 |
| 2015/0217606 | A1* | 8/2015 | Peng | ................... B60C 23/0496 |
| | | | | 73/146.8 |
| 2017/0001484 | A1* | 1/2017 | Keller | .................... F16K 15/207 |
| 2019/0001765 | A1* | 1/2019 | Jordan | ................. B60C 23/0457 |

FOREIGN PATENT DOCUMENTS

| | | |
|---|---|---|
| CN | 205168074 U | 4/2016 |
| CN | 206141238 U | 5/2017 |
| GB | 2490302 A | 10/2012 |

\* cited by examiner

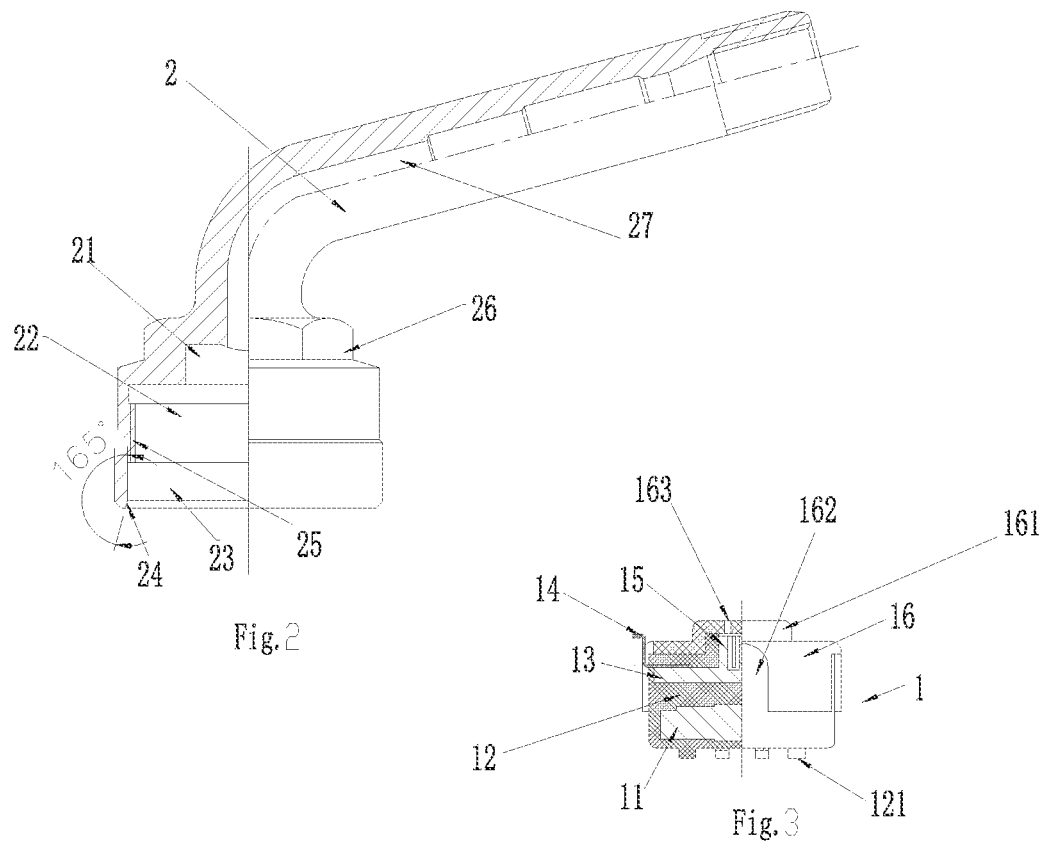
Fig.2
Fig.3
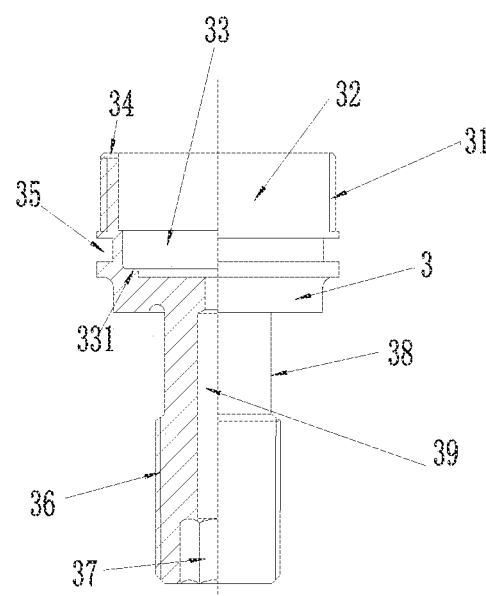
Fig.4

TPMS INFLATION VALVE FOR COMMERCIAL VEHICLE AND TPMS SENSOR SUBASSEMBLY

TECHNICAL FIELD

The present invention relates to a TPMS sensor and an inflation valve for a commercial vehicle, as well as a TPMS sensor subassembly.

BACKGROUND

The TPMS system has become a mandatory standard for automobiles, and its function is to detect the tire pressure and temperature in real time during the entire driving process, to ensure safe driving of the vehicle. At present, the sensor (signal acquisition and transmission unit) of the commercial vehicle TPMS system has the following installation types: 1. Built-in type. The TPMS sensor is mounted on the rear of the rim inflating valve and installed on an automobile rim together with the inflating valve (the TPMS sensor is in the automobile rim). 2. External type. TPMS sensor is mounted on a dedicated external inflating valve and then connected with the external inflating valve to the mouth of the rim inflating valve with threads (the TPMS sensor is located outside the automobile rim). The above two mounting modes have their own advantages in use, but both have functional or structural defects.

Due to the diversification of the size of commercial vehicles (truck, passenger cars and construction vehicles) and the number of tires, most of the wheels are far away from the center console of the cab. The distance from the sensor (signal transmitting unit) of the TPMS system to the receiver of the center console of the automobile (signal receiving and processing unit) is large, which requires the transmitting unit to stably maintain a strong RF output signal during the driving of the automobile. For the built-in TPMS system currently in use by commercial vehicle manufacturers and the after-sales installation and repair and replacement markets, because the sensor is placed in the tire, its radio frequency signal is greatly weakened by the shielding effect of the metal rim, resulting in high energy consumption and instable radio frequency signal transmission of the sensor's built-in power supply. The external TPMS system can avoid the above defects because the sensor is placed outside the rim, but due to the mounted structure and connection method, the sensor is easily lost or stolen because of loosening of connection during driving process.

SUMMARY

The object of the present invention is to provide a TPMS inflation valve for a commercial vehicle. A radio frequency signal acquisition and transmission unit sensor is arranged inside a rim inflation valve structure to form a whole with the inflation valve and is located outside a rim when mounted, and as such, defects that signals of an existing internal sensor are affected by shielding of the rim and an external sensor is prone to being lost and stolen are effectively overcome. For this purpose, the present invention adopts the following technical solutions:

A TPMS inflation valve for a commercial vehicle is provided. The inflation valve is provided with an inflation valve body, an inflation valve seat and a sensor subassembly, wherein the inflation valve body and the inflation valve seat are components split apart from each other; the inflation valve is mounted on an automobile rim by means of the inflation valve seat; the inflation valve body is provided with an installation portion for a valve core; the inflation valve body and the inflation valve seat are assembled and connected to form an airflow channel for communication; a cavity located outside the automobile rim and close to the automobile rim is formed at the position where the inflation valve body and the inflation valve seat are assembled and connected; the sensor subassembly is arranged in the cavity; and the cavity is in communication with the airflow channel of the inflation valve or is located on the airflow channel.

Further, an antenna of the sensor subassembly can be an epitaxial antenna thereof by means of the inflation valve body.

Further, the antenna of the sensor subassembly is welded on the inflation valve seat.

Further, a threaded connection structure is arranged at the tail part of the inflation valve seat, a clamping groove is formed in the inflation valve seat to arrange a sealing gasket, and the inflation valve is mounted on the rim in a compressed manner through cooperation of an upper groove wall of the clamping groove with a fastener and a washer connected with the threaded connection structure.

Further, the inflation valve seat is insulated from the rim.

Further, the inflation valve body and the inflation valve seat are in threaded connection and are fastened by means of a threaded sealant, and the inflation valve body and the inflation valve seat are further sealed by means of a sealing ring.

Further, the sensor subassembly is compressed by a limiting spring above to maintain ventilation between a part above the sensor subassembly and the top wall of the cavity. A plurality of support bulges are arranged at the bottom of the sensor subassembly. The support bulges maintain the sensor subassembly in a radial position and support the bottom of the sensor subassembly away from the bottom wall of the cavity to maintain ventilation. A gap between a side wall of the cavity and a side surface of the sensor subassembly provides an airflow channel on a side surface. The airflow channels form an airflow channel in the cavity together and are in communication with an airflow channel of the inflation valve body and the inflation valve seat.

Further, the pressing spring is a left-hand spring, and a spring end face is in a sliding friction state when the inflation valve body and the inflation valve seat are screwed.

Another technical problem to be solved by the present invention is to provide a TPMS sensor subassembly applicable to be mounted in the inflation valve. The sensor subassembly is applicable to being mounted in the inflation valve, is prevented from being stolen, and meanwhile does not interference with airflow in the inflation valve. For this purpose, the present invention adopts the following technical solutions:

A TPMS sensor subassembly which is applicable to being mounted in an inflation valve, comprising a shell, a capsule and an internal circuit board, wherein a spring limiting portion is arranged at the top of the shell; a plurality of support bulges are arranged at the bottom of the sensor subassembly; and a vent hole in communication with an electronic device in the circuit board is formed in the sensor subassembly.

Further, a claw part is formed at a lateral part of the shell. The lateral part of the capsule is clamped with the claw part of the shell. A ventilation groove of a side surface is formed between claws. A vent hole is formed on the top of the shell.

By adopting the technical solutions of the present invention, according to the TPMS and the inflation valve, the TPMS sensor and the rim inflation valve are designed into a whole and installed on the rim, and as such, not only is the communication reliability guaranteed, but the connection strength is also high. The TPMS inflation valve is not prone to being lost or stolen, and the functional and structural defects of existing TPMS systems for commercial vehicles are effectively overcome.

BRIEF DESCRIPTION OF THE DRAWINGS

FIG. 2 shows a half-sectional view of an inflation valve body;

FIG. 3 shows a half-sectional view of a sensor subassembly; and

FIG. 4 shows a half-sectional view of an inflation valve seat.

DETAILED DESCRIPTION

Figure 1:
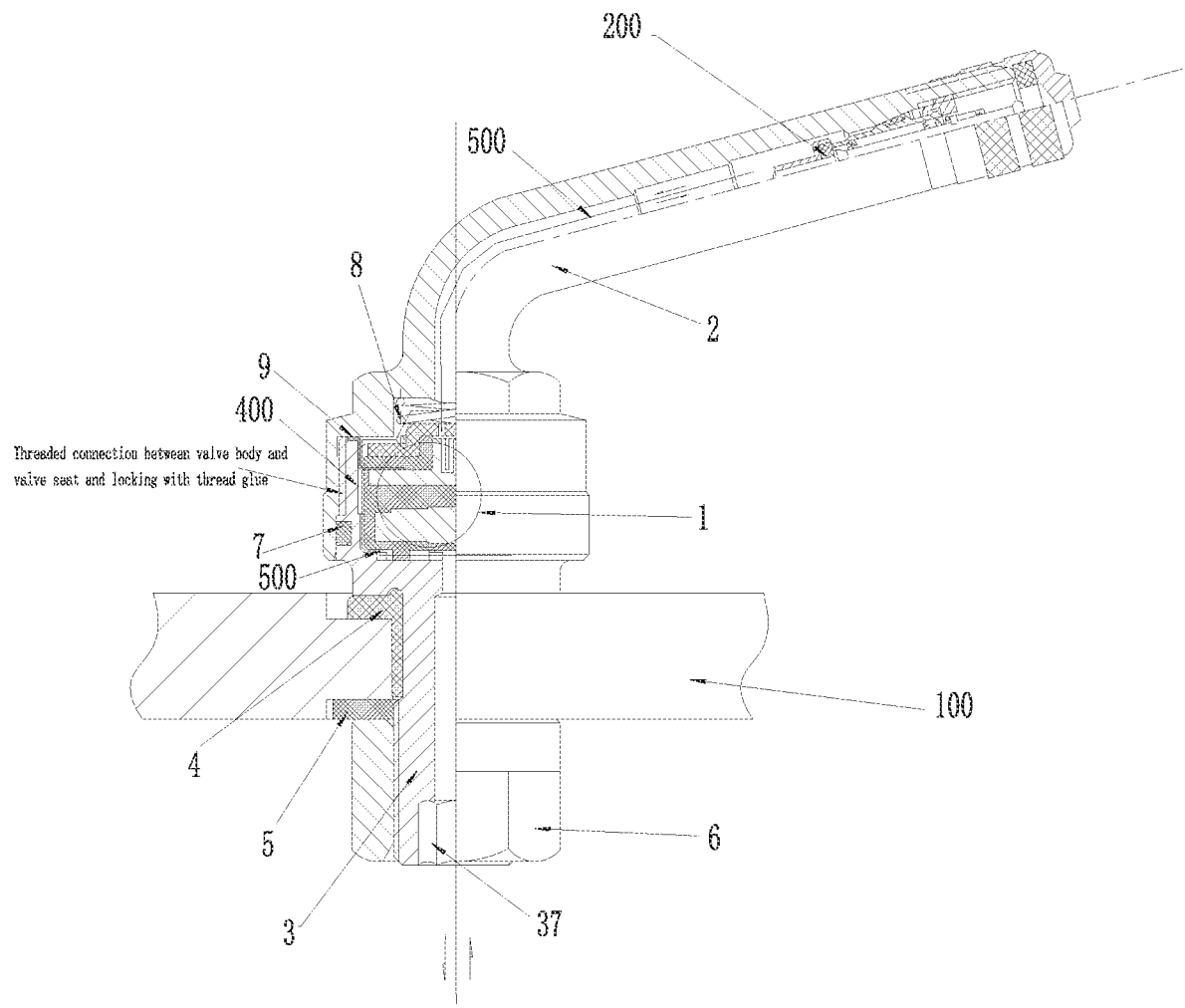
FIG. 1 shows a half-sectional view of an embodiment of the present invention.

Referring to the drawings, a TPMS inflation valve for a commercial vehicle, provided by the invention, is provided with an inflation valve body 2, an inflation valve seat 3 and a sensor subassembly 1, wherein the inflation valve body 2 and the inflation valve seat 3 are components split apart from each other; the inflation valve is mounted on an automobile rim 100 by means of the inflation valve seat 3; the inflation valve body 2 is provided with an installation portion for a valve core 200; the valve core 200 is mounted at the front part in the inflation valve body 2; the inflation valve body 2 and the inflation valve seat 3 are assembled and connected to form an airflow channel 500 for communication; a cavity 400 located outside the automobile rim 100 and close to the automobile rim 100 is formed at the position where the inflation valve body 2 and the inflation valve seat 3 are assembled and connected; the sensor subassembly 1 is arranged in the cavity 400; and the cavity 400 is in communication with the airflow channel 500 of the inflation valve or is located on the airflow channel 500.

The sensor subassembly mainly comprises a circuit board and a packaging body thereof to form a module which is applicable to being mounted in the cavity 400. As shown in FIGS. 1 and 2, the sensor subassembly 1 is formed into a whole by an electronic element battery 11, a PCB 13, an antenna 14 and a chip 15 and is mounted on a claw-shaped plastic shell 16. A boss 161 is arranged at the top of the shell 16. A sensor air inlet 163 is formed in the boss 161. A shell column section forms a 4-leaf claw shape. A constant ventilation groove 162 is formed in the gap of claws by means of a shell wall thickness. 4 uniformly distributed support legs 121 are arranged at the bottom of a low-pressure injection molded body 12, which, together with the ventilation groove 161, form an airflow channel between the sensor subassembly 1 and the inflation valve seat 3. The radio frequency of the sensor 1 may be modulated in an FSK or PPM mode.

As shown in FIGS. 1 and 2, an axial through hole 27 is formed in the inflation valve body 2. The bottom end of the valve body 2 takes the shape of a hexagonal column and a cylinder. The hexagonal column 26 is assembled with the valve seat 3 by using a common wrench. The inner hole in the bottom end of the valve body 2 is of a stepped cylinder shape. A sensor limiting spring 8 is arranged in an inner cylindrical hole 21 in the upper part of the cylinder shape. Inner threads 25 for assembling design with the inflation valve seat 3 are formed in an inner cylinder shape 22 in the middle of the cylinder shape. An inner cylinder shape 23 in the lower part of the cylinder shape is a sealing surface of an "O"-shaped sealing ring 7. A slope 24 of 15 degrees on the inner cylinder shape 23 is an assembling leading section of the "O"-shaped sealing ring 7.

As shown in FIGS. 1 and 4, an axial through hole 39 is formed in the inflation valve seat 3. Outer threads 31 are formed in the outer circle of the upper end of the valve seat 3 and are used for being assembled with the inner threads 25 of the valve body 2. A notch 34 is formed in the opening end of the outer circle and is used for limiting and welding an antenna 14. A groove 35 is formed in the outer circle of the upper end of the valve seat 3 and below the outer threads 31, as an installation position of the "O"-shaped sealing ring 7. Inner cylindrical holes 32 and 33 are formed in the upper end of the valve seat 3 and are used for mounting the sensor subassembly 1. A single-side matching gap between the inner hole diameter of the inner cylindrical hole 33 and the maximum outer diameter of the low-pressure injection molded body 12 of the sensor subassembly 1 is greater than or equal to 0.2 mm. The inner cylindrical holes 32 and 33, bottoms thereof and the stepped cylinder shape of the valve body 2 form a cavity 500 for mounting the sensor subassembly. The lower end of the cavity 500 is in communication with the axial through hole 39 of the valve seat 3, and the upper end is in communication with the axial through hole 27 of the valve body 2, to form an airflow channel for communication. A mounting groove 38 of an inflation valve sealing ring 4 is formed in a rod part of the valve seat 3. Outer threads 36 are formed in the tail end of the inflation valve seat 3 and are used for mounting a hexagon nut 6. A tail hexagonal hole 37 is formed in the tail part to use an internal hexagonal wrench when the valve seat 3 and the valve body 2 are assembled.

As shown in FIG. 1, the sensor subassembly 1 of the present invention is located in the cavity formed by the inflation valve body 2 and the inflation valve seat 3. The antenna 14 of the sensor subassembly 1 is led out to be welded at the notch 34 of the valve seat 3 (antenna welding point 9), and thus the valve seat 3 and the valve body 2 also form an epitaxial antenna of a sensor 1. A left-hand limiting spring 8 sleeves the boss 161 of the shell 16 of the sensor 1, and is arranged in the inner cylindrical hole 21 of the valve body 2. When the valve body 2 and the valve seat 3 are screwed, an end face of the left-hand limiting spring 8 is in a sliding friction state with small resistance, and the left-hand limiting spring 8 prevents the sensor subassembly 1 from moving arbitrarily in the inflation valve when the rim is rotated at a high speed. Due to the pressure function of the limiting spring 8, both the position of the sensor subassembly 1 in the cavity 500 formed by the valve body 2 and the valve seat is limited, and a constant airflow channel between the upper plane of the sensor shell 16 and the inner plane of the valve body 2 is guaranteed. Cooperation of the support legs 121 and the bottom 331 of the inner hole of the valve seat 3 guarantees that a stable gap is formed between the bottom of the sensor subassembly and the bottom 331 of the cavity. The constant ventilation groove 162 is formed in the gap of claws by means of the shell wall thickness, and as such, the axial through hole of the valve body 2 and the axial through hole of the valve seat 3 are in communication, and a sensing chip 15 above the PCB 13 timely receives tire pressure and temperature information through the air inlet 163. The inner cylindrical hole 23 and the slope 24 of 15 degrees of the valve body 2 and the "O"-shaped groove 35 and the "O"-shaped sealing ring 7 of the valve seat 3 form assembling sealing of the valve body 2 and the valve seat 3. The inner threads 25 of the valve body 2 and the outer threads 31 of the valve seat 3 are fastened by means of the threaded sealant to form secondary sealing of the valve body 2 and the valve seat 3, in addition, the position where the valve body and the valve seat form the cavity is in threaded connection with the sealant for fastening, and as such, the connection strength is far greater than that of conventional external sensors and valve bodies. When the inflation valve for the commercial vehicle is mounted on the rim, a plastic washer 5 is arranged on a lower groove wall of the groove 38, the inflation valve sealing ring 4 is arranged between an upper groove wall of the groove 38 and an outer side surface of the rim and between the groove bottom wall and the rim, and an insulating zone between the inflation valve and the rim is formed by the inflation valve sealing ring 4 and the plastic washer 5 to prevent a metallic rim from interfering radio frequency signals of the senor.

As an alternative, modes such as forming air holes in components can also form the airflow channel for communication.

The above descriptions are only specific embodiments of the present invention, but structural features of the present invention are not limited thereto. Any changes or modifications made by those skilled in the art in the field of the present invention shall fall within the scope of protection of the present invention.

The invention claimed is:

1. A TPMS inflation valve for a commercial vehicle, wherein the inflation valve is provided with an inflation valve body, an inflation valve seat and a sensor subassembly, wherein the inflation valve body and the inflation valve seat are components split apart from each other, the inflation valve is mounted on an automobile rim by means of the inflation valve seat, the inflation valve body is provided with an installation portion for a valve core; the inflation valve body and the inflation valve seat are assembled and connected to form an airflow channel for communication, a cavity located outside the automobile rim is formed at the position where the inflation valve body and the inflation valve seat are assembled and connected, the sensor subassembly is arranged in the cavity, and the cavity is in communication with the airflow channel of the inflation valve or is located on the airflow channel;

wherein the sensor subassembly is compressed by a limiting spring above to maintain ventilation between a part above the sensor subassembly and the top wall of the cavity; a plurality of sensor bulges are arranged at the bottom of the sensor subassembly, the sensor bulges maintain the sensor subassembly in an axial position and support the bottom of the sensor subassembly away from the bottom wall of the cavity to maintain ventilation, a gap between a side wall of the cavity and a side surface of the sensor subassembly provides an airflow channel on a side surface, the airflow channels form an airflow channel in the cavity together and are in communication with an airflow channel of the inflation valve body and the inflation valve seat.

2. The TPMS inflation valve for a commercial vehicle according to claim 1, wherein the inflation valve seat and the inflation valve body form an epitaxial antenna of the sensor subassembly.

3. The TPMS inflation valve for a commercial vehicle according to claim 2, wherein the antenna of the sensor subassembly is welded on the inflation valve seat.

4. The TPMS inflation valve for a commercial vehicle according to claim 1, wherein a threaded connection structure is arranged at the tail part of the inflation valve seat, a clamping groove is formed in the inflation valve seat to arrange a sealing gasket, and the inflation valve is mounted on the rim in a compressed manner through cooperation of an upper groove wall of the clamping groove with a fastener and a washer connected with the threaded connection structure.

5. The TPMS inflation valve for a commercial vehicle according to claim 1, wherein the inflation valve seat is insulated from the rim.

6. The TPMS inflation valve for a commercial vehicle according to claim 1, wherein the inflation valve body and the inflation valve seat are in threaded connection and are fastened by means of a threaded sealant, and the inflation valve body and the inflation valve seat are further sealed by means of a sealing ring.

7. The TPMS inflation valve for a commercial vehicle according to claim 1, wherein the pressing spring is a left-hand spring, and a spring end face is in a sliding friction state when the inflation valve body and the inflation valve seat are screwed.

8. The TPMS inflation valve for a commercial vehicle according to claim 2, wherein the antenna of the sensor subassembly is welded on the inflation valve seat.

* * * * *